Dec. 14, 1965 J. F. LAWRENCE, JR 3,223,939
SELF-NEUTRALIZING DRIVE SYSTEM FOR PUSH-PULL RADIO FREQUENCY AMPLIFIERS
Filed June 27, 1963
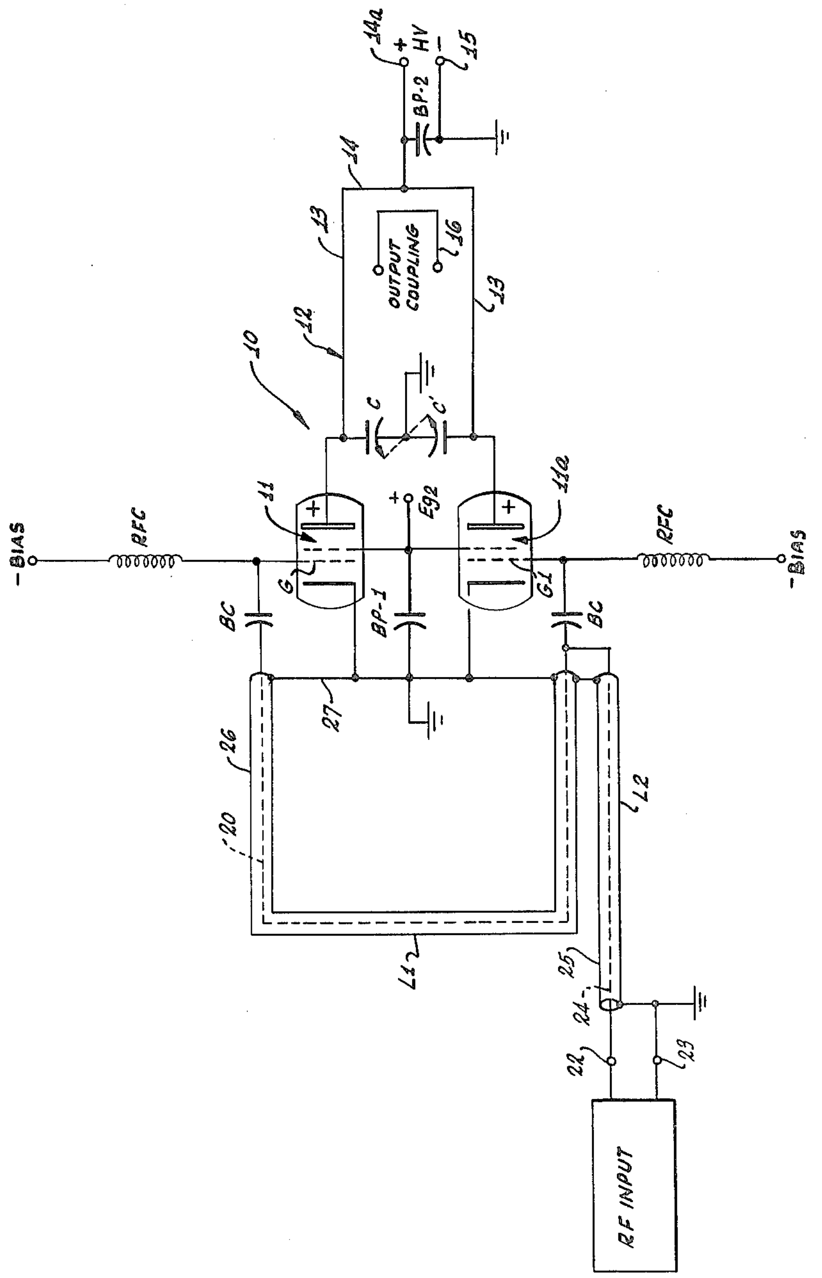
INVENTOR.
JAMES F. LAWRENCE JR.
BY Lilly & Nyhagen
Attorneys 3,223,939

SELF-NEUTRALIZING DRIVE SYSTEM FOR PUSH-PULL RADIO FREQUENCY AMPLIFIERS

James F. Lawrence, Jr., 465 Sequoia Drive, Pasadena, Calif.

Filed June 27, 1963, Ser. No. 292,202
13 Claims. (Cl. 330—55)

This invention relates generally to radio frequency push-pull amplifiers and, more particularly, to means for stabilizing radio frequency push-pull amplifiers against instability due to regeneration or oscillation produced by plate-to-grid feedback.

This application is a continuation-in-part of my co-pending application Serial No. 847,655, filed October 20, 1959, for Self-Neutralizing Drive System for Push-Pull Radio Frequency Amplifiers, now abandoned.

It is well known in the art that some RF feedback is always present in RF amplifiers, particularly those operating at the higher frequencies, due to internal coupling between tube plate and control grid. Feedback is commonly reduced by various methods of neutralization well known in the art. However, none of these neutralization methods have been successful in reducing the feedback voltage to zero. In the case of the high-gain tubes, such as tetrodes, a grounded grid system has commonly been used to attain stability when operating at the higher frequencies. The grounded grid configuration, however, is not usually convenient from the standpoint of a mechanical or physical layout, and requires high amounts of RF drive power.

Accordingly, one object of the present invention is the provision of an improved system for neutralizing feedback due to plate-to-grid coupling in push-pull RF amplifiers.

Another object is to provide a new and improved push-pull amplifier which is characterized by enhanced stability at higher operating frequencies.

These and other objects and advantages of the invention will be apparent from the following description, when taken in conjunction with the accompanying drawing, wherein the single figure illustrates a push-pull RF amplifier embodying the invention.

A major feature of my invention is that the cathodes or filaments may be grounded, and external neutralization is not required.

In practicing my invention, I provide a coaxial transmission line which connects to the grids of the amplifier tubes through a D.C. blocking capacitor. The length of the transmission line is adjusted to equal one-half of an electrical wave length at the operating frequency of the amplifier. If RF energy is applied to one end of this half wave line and the associated grid, a complete phase reversal, or 180° phase delay, will occur therein. The phase delay properties of a half wave length untuned transmission line are, of course, well known in the art. This 180° phase delay between inputs to the amplifier grids is necessary for proper push-pull drive of the amplifier. The length of the line may be made adjustable for exact half wave length operation at the applied frequency.

The aforementioned configuration also functions to neutralize grid-to-plate feedback, and so contributes to stability in that energy coupled back to the grid from the plate of one tube is conducted by the half wave line, with complete phase reversal, and amplitude attenuated only by losses in the half wave line, to the other tube grid, and due to this phase reversal provides effective neutralization, in a manner to be described hereinafter.

Referring now to the drawing, a push-pull amplifier 10 has two amplifier tubes 11 and 11*a* and a conventional plate tank circuit 12 comprising two lines 13, each of quarter wave length for the RF operating frequency, connected to the plates of the tubes at one end and shorted to one another at the other end, as at 14. The shorted ends of lines 13 are connected to the positive terminal 14*a* of a source of plate voltage HV, the negative terminal 15 of which is grounded, as indicated. A plate tank bypass capacitor BP–2 is connected across source HV. Ganged tuning capacitors C and C′ are connected in series across the plate ends of quarter wave lines 13, and the center point between the capacitors is grounded, as indicated. An output coupling from the plate tank circuit is conventionally indicated at 16. The plate tank circuit illustrated will be recognized to be merely a conventional example, subject to wide variation within the scope of the invention, and therefore requiring no further description herein.

The grid input circuit comprises a nonresonant transmission line L1, preferably coaxial, of half wave length for the RF operating frequency of the amplifier. The inner conductor 20 of this half wave line is coupled at opposite ends through D.C. blocking capacitors BC to the grids of the push-pull amplifier tubes 11, 11*a*. By way of example, the tubes 11, 11*a*, are shown as tetrodes.

The half wave line L1 is fed through a quarter wave length coaxial impedance matching transformer L2 connected to one end of line L1 from an RF input connected across a pair of input terminals 22, 23. As shown, the inner and outer conductors 24, 25, respectively, of transformer L2 are connected at one end to input terminals 22, 23, respectively, terminal 23 being grounded. At the opposite end of transformer L2, the inner and outer conductors 24, 25 are connected to the inner and outer conductors 20, 26, respectively, of line L1 at one end of the latter. Opposite ends of outer conductor 26 of line L1 are connected to a grounded conductor 27, which is also connected to the cathodes of the two tetrodes 11, 11*a*, completing the grid-cathode input circuit. Grids G and $G_1$ are connected through RF chokes RFC to sources of negative bias potential, and the screen grids of the tubes 11, 11*a* are connected to an appropriate screen voltage supply $Eg_2$. A screen grid bypass capacitor BP–1 is connected between the screen grids and ground.

Without intention of limitation, it may be stated that an amplifier 10 with the following circuit constants has performed satisfactorily at a frequency of 100 mc.

Tubes—Type 4CX 1000A
L1—Coaxial line of length 59. 4″
L2—Coaxial impedance matching transformer $Z_0=20\Omega$; length=29.7″
C—Variable plate tuning capacitor 2–20 mfd.
BP–1—Screen bypass capacitor .001 mfd.
BP–2—Plate tank bypass capacitor .005 mfd.
BC—D.C. blocking capacitors .015 mfd.
$Eg_2$—Screen voltage 300 V.D.C.
HV—Plate voltage 3000 V.D.C.
Output—3 kw. (100 mc.)
Input—50 watts (100 mc.)

As previously indicated, the half wave line L1, by virtue of its phase delay properties, provides the necessary 180° phase shift between the amplifier grids necessary for proper push-pull drive of the amplifier. That is to say, if an RF signal is impressed on grid $G_1$ from the RF input through transformer L2, this signal will be transmitted through half waveline L1 to grid G, with its phase reversed 180°, and with only the attenuation incident to the slight loss in the line L1. In this connection, the length of line L1 may readily be made adjustable for exact half wave length operation at the applied frequency. Moreover, the line L1 may have a length of any integral multiple of half wave lengths by accepting the penalty of additional attenuation. Use hereinafter of the expression half wave length is accordingly to be understood as including integral multiple half wave equivalents.

A feature of the system is that the impedance of the source or input is matched to the input impedance of the amplifier at the operating frequency. For example, assuming a standard 50 ohm transmission line leading from the source, i.e., a source impedance of 50 ohms, and an amplifier input impedance of 15 ohms, or less, the quarter wave length transformer L2 matches the source impedance to the amplifier input impedance. Thus, both grids are operated effectively from a very low impedance, and any energy feedback from the plate circuit is loaded heavily or dissipated by this low impedance.

Grid-to-plate feedback is neutralized, since energy fed back from the plate to the grid of one tube is conducted by the half wave line L1, but with phase reversed, to the grid of the other tube. Any feedback signal so reaching the grid of the other tube is amplified in the latter, and appears in the plate tank circuit in phase opposition to the initial signal that was fed back in the first tube, so that neutralization occurs. In more detail, this action occurs as follows:

At some particular instant of time in the RF cycle on the plate of the lower tube 11*a* in the drawing, for example, a positive pulse, or portion of a positive-going half cycle, attains a maximum positive value. The internal plate-to-grid tube capacitance causes the grid voltage to follow this positive plate voltage swing (normal drive voltage being neglected). This positive RF feedback pulse at the grid $G_1$ of the lower tube 11*a* is transmitted, with negligible attenuation, to the grid G of the other tube 11, but with 180° phase reversal. The grid of the upper tube thus swings negative. This causes the voltage on the plate of the upper tube to rise to a positive peak (still confining attention to feedback voltage only). Since the plates at the opposite ends of the plate tank push-pull circuit are 180° out of phase, a corresponding negative pulse appears at the plate of the lower tube. This negative pulse being in 180° phase opposition to the original positive pulse, or portion of a positive-going half cycle, at the plate of the lower tube, the original pulse is cancelled, and oscillation prevented.

Several significant advantages are realized in the above circuit, as follows: The intercoupling of the grids of the tubes results in neutralization and stabilization of the amplifier by cancellation of feedback voltage in a novel and simple manner. The low impedance grid driving source provides improved stability over the performance of conventional tuned circuits of high impedance. Critical grid circuit tuning is eliminated by virtue of the low impedance drive circuitry. The RF shielding provided by the coaxial line drive system reduces RF pickup from the output circuit. The input circuit lends itself to impedance matching transformation resulting in maximum power transfer to the control grids. The cathodes may be grounded.

It will be apparent from the foregoing that, while a particular form of my invention has been illustrated and described, various modifications can be made without departing from the spirit and scope of my invention. Accordingly, I do not intend that my invention be limited, except as by the appended claims.

I claim:

1. In a radio frequency push-pull amplifier having a pair of amplifier tubes and a push-pull plate tank circuit coupled to the plates of said tubes, a half wave length, phase reversing nonresonant transmission line intercoupling the grids of said tubes at opposite remote ends of said line, and means for impressing a radio frequency signal at one of said remote ends of said line.

2. An electrical circuit as set forth in claim 1, wherein said half wave length nonresonant transmission line is a coaxial line.

3. An electrical circuit as set forth in claim 2, wherein the grids of said amplifier tubes are connected to opposite ends of the inner conductor of said transmission line, and the cathodes of said amplifier tubes and the opposite ends of the outer conductor of said transmission line are grounded.

4. In a radio frequency push-pull amplifier having a pair of amplifier tubes and a push-pull plate tank circuit coupled to the plates of said tubes, a low impedance half wave length, phase reversing nonresonant transmission line intercoupling the grids of said tubes, a radio frequency input source, and a quarter wave length impedance matching transformer connected between said radio frequency input source and the grid of one of said tubes.

5. In a radio-frequency push-pull amplifier having a pair of amplifier tubes and a push-pull plate tank circuit coupled to the plates of said tubes, a low impedance coaxial half wave length, phase reversing nonresonant transmission line, a pair of blocking capacitors respectively connected at one side to the grids of said tubes and at the other side to opposite ends of the inside conductor of said half wave length coaxial line, means for impressing a radio frequency signal on the grid of one of said tubes through the corresponding blocking capacitor, and means grounding the cathodes of said tubes and the outside conductor of said coaxial line.

6. In a radio frequency push-pull amplifier including a pair of amplifier devices, each having a supply voltage electrode, a control electrode and a common return electrode, and a push-pull tank circuit coupled to the supply voltage electrodes of said devices, means for impressing a radio frequency signal between the control electrode and the return electrode of one of said devices, and a half wave length, phase reversing nonresonant transmission line intercoupling the control electrode and the return electrode of one of said devices respectively with the control electrode and the return electrode of the other of said devices.

7. An electrical circuit as set forth in claim 6, wherein said half wave length nonresonant transmission line is a coaxial line.

8. In a radio frequency push-pull amplifier including a pair of amplifier devices, each having a supply voltage electrode, a control electrode and a common return electrode, and a push-pull tank circuit coupled to the supply voltage electrodes of said devices, a radio frequency signal source, a quarter wave length impedance matching transformer connecting said radio frequency signal source between the control electrode and return electrode of one of said devices for impressing a radio frequency signal thereon, and a half wave length, phase reversing nonresonant transmission line intercoupling the control electrode and the return electrode of one of said devices respectively with the control electrode and the return electrode of the other of said devices.

9. An electrical circuit as set forth in claim 8, wherein said half wave length and said quarter wave length transformer are coaxial lines.

10. In a radio frequency push-pull amplifier including a pair of amplifier devices, each having a supply of voltage electrode, a control electrode and a common return electrode, and a push-pull tank circuit coupled to the supply voltage electrodes of said devices, a half wave length, phase reversing nonresonant transmission line having first and second conductors, a pair of capacitors respectively connected at one side to the control electrodes of said devices and at the other side to opposite ends of the first conductor of said half wave length line, means for impressing a radio frequency signal between the control electrode and the return electrode of one of said devices through the corresponding capacitor, and means for grounding the return electrodes of said devices and the second conductor of said line.

11. An electrical circuit as set forth in claim 10, wherein said means for impressing a radio frequency signal includes a quarter wave length impedance matching transformer impressing the radio frequency signal between the control electrode and the return electrode of one of said devices through the corresponding capacitor.

12. In a radio frequency push-pull amplifier including a pair of amplifier devices, each having a supply voltage electrode, a control electrode and a common return electrode, and a push-pull tank circuit coupled to the supply voltage electrodes of said devices, a half wave length, phase reversing nonresonant transmission line having first and second conductors, a pair of capacitors respectively connected at one side to the control electrodes of said devices and at the other side to opposite ends of the first conductor of said half wave length line, a quarter wave length impedance matching transformer for impressing a radio frequency signal between the control electrode and the return electrode of one of said devices through the corresponding capacitor, and means for grounding the return electrodes of said devices and the second conductor of said line.

13. An electrical circuit as set forth in claim 12, wherein said half wave length line and said quarter wave length transformer are coaxial lines having inner and outer conductors, said inner conductor being connected to said capacitors and said outer conductor being grounded with the return electrodes of said devices.

References Cited by the Examiner

UNITED STATES PATENTS 2,269,079 1/1942 Christ ------------ 330—77 X

ROY LAKE, *Primary Examiner.*